US010905102B2

(12) United States Patent
Leslie et al.

(10) Patent No.: US 10,905,102 B2
(45) Date of Patent: Feb. 2, 2021

(54) AUTOMATED CAGED BIRD SPRAY APPLICATOR SYSTEM

(71) Applicant: BOEHRINGER INGELHEIM ANIMAL HEALTH USA INC., Duluth, GA (US)

(72) Inventors: Christopher Davis Leslie, Cleveland, GA (US); Francisco Javier Rojo Barrañón, Corregidora (MX); Hector Valdemar Garcia Espinosa, San Juan de Aragon (MX)

(73) Assignee: BOEHRINGER INGELHEIM ANIMAL HEALTH USA INC., Duluth, GA (US)

( * ) Notice: Subject to any disclaimer, the term of this patent is extended or adjusted under 35 U.S.C. 154(b) by 457 days.

(21) Appl. No.: 15/292,950

(22) Filed: Oct. 13, 2016

(65) Prior Publication Data

US 2017/0118955 A1    May 4, 2017

Related U.S. Application Data

(60) Provisional application No. 62/240,926, filed on Oct. 13, 2015.

(51) Int. Cl.
*A01K 45/00* (2006.01)
*A61D 7/00* (2006.01)
(Continued)

(52) U.S. Cl.
CPC .............. *A01K 13/003* (2013.01); *A01K 5/02* (2013.01); *A01K 31/002* (2013.01);
(Continued)

(58) Field of Classification Search
CPC .... A01K 13/003; A01K 13/002; A61D 1/025; A61D 7/00
See application file for complete search history.

(56) References Cited

U.S. PATENT DOCUMENTS 1,767,560 A * 6/1930 Snyder ................. A01K 13/003
119/667
2,608,952 A * 9/1952 Herbert ................ A01K 13/003
119/669
(Continued)

FOREIGN PATENT DOCUMENTS

CA         2377282 A1 * 12/2000  ........... A01K 13/003
WO   WO-2004043612 A1 *  5/2004  ............. A01K 45/00
WO    WO 2012016328 A1    2/2012

OTHER PUBLICATIONS

Roberto Soares and Marcelo Paniago. Spray Vaccination: What Happens During and After This Procedure. Issue No. 13 / Jul. 2007. Hatchery Expertise Online.

*Primary Examiner* — Peter M Poon
*Assistant Examiner* — Morgan T Barlow
(74) *Attorney, Agent, or Firm* — John Ezcurra

(57) ABSTRACT

The application discloses a spray applicator system attachable to a poultry feeder for accurately and precisely dosing liquid formulations, including vaccines and probiotic formulations, to caged avian animals. The application discloses spray applicators, having improved acceptance by the avian animals, relative to more disruptive prior spray applicators. The disclosed automated caged spray applicator system is designed to attach to and function with automated poultry feeding systems, routinely used in poultry house settings.

7 Claims, 12 Drawing Sheets

(51) Int. Cl.
  *A61D 1/02* (2006.01)
  *A01K 13/00* (2006.01)
  *A01K 5/02* (2006.01)
  *A01K 31/00* (2006.01)
  *A01K 39/012* (2006.01)
  *B05B 9/04* (2006.01)

(52) U.S. Cl.
  CPC ............ *A01K 39/012* (2013.01); *A01K 45/00* (2013.01); *A01K 45/002* (2013.01); *A61D 1/025* (2013.01); *A61D 7/00* (2013.01); *B05B 9/04* (2013.01)

(56) References Cited

U.S. PATENT DOCUMENTS

| | | | | |
|---|---|---|---|---|
| 3,163,149 | A * | 12/1964 | Ivey | A01K 1/031 119/479 |
| 3,941,096 | A * | 3/1976 | Mann | A01K 13/003 119/657 |
| 4,126,104 | A * | 11/1978 | Overby | A01K 13/001 119/667 |
| 4,316,464 | A * | 2/1982 | Peterson | A61D 7/00 604/24 |
| 4,535,726 | A * | 8/1985 | Cauthron | A01K 13/003 119/666 |
| 4,565,160 | A * | 1/1986 | Cook | A23N 17/004 119/665 |
| 4,580,529 | A * | 4/1986 | Wilson | A01K 13/003 119/62 |
| 4,643,354 | A * | 2/1987 | Stowe | B05B 7/24 128/200.14 |
| 4,850,997 | A * | 7/1989 | DuBose | A61D 1/025 604/289 |
| 4,987,861 | A * | 1/1991 | Lemire | A01K 13/001 119/667 |
| 5,027,747 | A * | 7/1991 | Talley | A01K 13/003 119/652 |
| 5,063,880 | A * | 11/1991 | Bouthillier | A01K 13/001 119/667 |
| 5,099,792 | A * | 3/1992 | Cannon | A61D 7/04 119/420 |
| 5,299,737 | A * | 4/1994 | McGinnis | B05B 7/0075 239/77 |
| 5,988,113 | A * | 11/1999 | Zhioua | A01K 13/003 119/657 |
| 6,029,610 | A * | 2/2000 | Ramsey | A01K 13/001 119/651 |
| 6,796,964 | B2 * | 9/2004 | Eidson | A61D 7/00 604/135 |
| 8,137,615 | B2 * | 3/2012 | Van Hooser | A23L 3/3454 119/174 |
| 8,881,998 | B1 * | 11/2014 | Sinkfield | A61F 7/0053 119/665 |
| 9,339,009 | B1 * | 5/2016 | Larson | A01K 13/003 |
| 10,350,041 | B2 * | 7/2019 | Samson | A61D 3/00 |
| 2002/0104485 | A1 * | 8/2002 | Lewis | A01K 1/0082 119/72.5 |
| 2002/0179020 | A1 * | 12/2002 | Zhioua | A01K 13/003 119/666 |
| 2004/0144873 | A1 | 7/2004 | Johnston | |
| 2004/0195382 | A1 * | 10/2004 | Anderson | A61D 7/00 239/525 |
| 2005/0145712 | A1 | 7/2005 | Bagnall | |
| 2008/0053379 | A1 * | 3/2008 | Markewitz | A01K 13/00 119/600 |
| 2008/0127903 | A1 * | 6/2008 | Mann | A01K 5/01 119/61.31 |
| 2008/0195064 | A1 * | 8/2008 | Correa | A61D 1/025 604/289 |
| 2011/0217322 | A1 * | 9/2011 | Purswell | A61D 1/025 424/184.1 |
| 2015/0128873 | A1 | 5/2015 | Prescott et al. | |
| 2015/0230428 | A1 * | 8/2015 | Fussell, Jr. | A01K 13/001 119/667 |
| 2018/0256303 | A1 * | 9/2018 | Neupert | A61D 1/025 |

* cited by examiner

AUTOMATED CAGED BIRD SPRAY APPLICATOR SYSTEM

CROSS-REFERENCE TO RELATED APPLICATIONS

This application claims priority to U.S. Ser. No. 62/240,926, filed on 13 Oct. 2015, and herein incorporated by reference in its entirety.

INCORPORATION BY REFERENCE

This application incorporates by reference herein all references cited herein.

FIELD OF THE INVENTION

The disclosure generally relates to spray applicators for dosing vaccines and/or administering probiotics to caged avian animals. In particular, the disclosure relates to spray applicators having improved acceptance by the avian animals, relative to more disruptive prior spray applicators. The disclosed automated caged spray applicator system is designed to attach to and function with automated poultry feeding systems.

BACKGROUND OF THE INVENTION

Current spray application for caged birds requires the operator to either push a cart with an attached tank, or, carry a backpack tank filled with compositions, including vaccine compositions, and walk at a controlled speed to evenly distribute the compositions to the caged birds. Both methods rely on a "mast and nozzle system," which distributes the nozzles in such a way that they are roughly aligned with each cage tier, to optimize the application of vaccine to each bird in the cage. These methods are not without significant drawbacks. For example, the operator must push the cart (or walk with the pack) at an optimum and consistent speed, both to ensure that the birds receive a full dose, and to minimize waste. As such, distribution, efficacy, and cost-effectiveness largely depend upon how quickly and consistently each person passes through a given poultry house, leading to significant and costly farm to farm variation.

Another drawback to current spray systems stems from the variation in poultry cage design. For example, some cages are not completely vertical, but are instead more pyramidal in shape. In this case, the vertical mast of the current sprayer systems is not optimally compatible, leading to waste and reduced vaccine efficacy. As a consequence of this incompatible geometry, the cages closer to the bottom are much closer to the spray nozzles, such that the cages on higher rows receive less vaccine than the cages on lower rows. Some of the cages at the highest levels do not even receive vaccine, which becomes particularly problematic at new facilities having more than eight levels of cages. In addition, the birds often become frightened by the current systems, and move the rear of the cages, thus increasing waste and reducing effective vaccination. And while the cart system is workable, it is bulky and can become cumbersome and difficult to move between houses and farms that have stairs, doorways, rough surfaces, and the like. Finally, the space between cages where the cart must be pushed differs among houses/farms, and there are some farms where the path is not level.

Accordingly, there is a real need in the poultry industry for improved spray vaccinators, which do not suffer from the drawbacks mentioned above. The field requires a spray vaccinator for caged birds having improved efficacy and reduced waste.

ADVANTAGES

The automated caged bird spray applicator would be provided as a versatile kit, which can be attached to an automated caged bird feeding apparatus, and easily transported to and from the poultry houses. Such an automated system eliminates the variability inherent in the current "human-powered" caged bird spray vaccinators.

Further, since the birds are already accustomed to the automated feeder, and in fact, welcome its presence, the automated caged bird spray applicator will be far less likely to cause the birds to retreat to the back of the cages.

SUMMARY OF THE INVENTION

An object of the current invention is to provide an automated caged bird spray applicator system for delivering compositions, including vaccine compositions, to caged avian animals. In particular, the disclosure relates to spray applicators having improved acceptance by the avian animals, relative to more disruptive prior art spray vaccinators. The disclosed automated caged spray applicator system is designed to attach to and function with automated feeding systems.

In an embodiment, the spray applicator system is provided as a compact portable system comprising nozzles, which mount directly onto an automated feeder system via industrial grade magnets and adjustable nozzle retaining means, including holders, for optimum spray coverage. The movement of the feeder system along the rows of cages provides consistent spray application and dosage by controlled speed of travel.

In an embodiment, nozzles may be positioned in optimal proximity and direction, with respect to the birds, irrespective of the placement, orientation, or arrangement of the cages.

In a particular embodiment, birds that have moved to front of the cage to feed will now be vaccinated at the same time, thereby increasing the likelihood that a given bird will receive an effective dose of vaccine.

In one embodiment of the spray applicator system, the system comprises a composition-containing bag or reservoir, a pump, a battery, a pressure regulator, a pressure gauge, a battery meter, nozzles, means for securing/attaching nozzles to an automated feeder system, and all necessary tubing for carrying fluid from the composition-containing bag to the pump and from the pump to the spray nozzle. The system may include a portable case, which may house, contain or store all the above-recited system components. The nozzle securing means may comprise a pivot arm, to provide a full range of motion to accommodate various mounting angles. The nozzle securing means may comprise a strong magnet, operably connected to the nozzle.

In another embodiment, the composition bag may be reversibly attached and/or suspended from the automated feeder. The nozzles may be placed at appropriate positions along the feeder such that vaccine is optimally directed toward the birds.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, wherein.

DETAILED DESCRIPTION OF THE INVENTION

Figure 1:
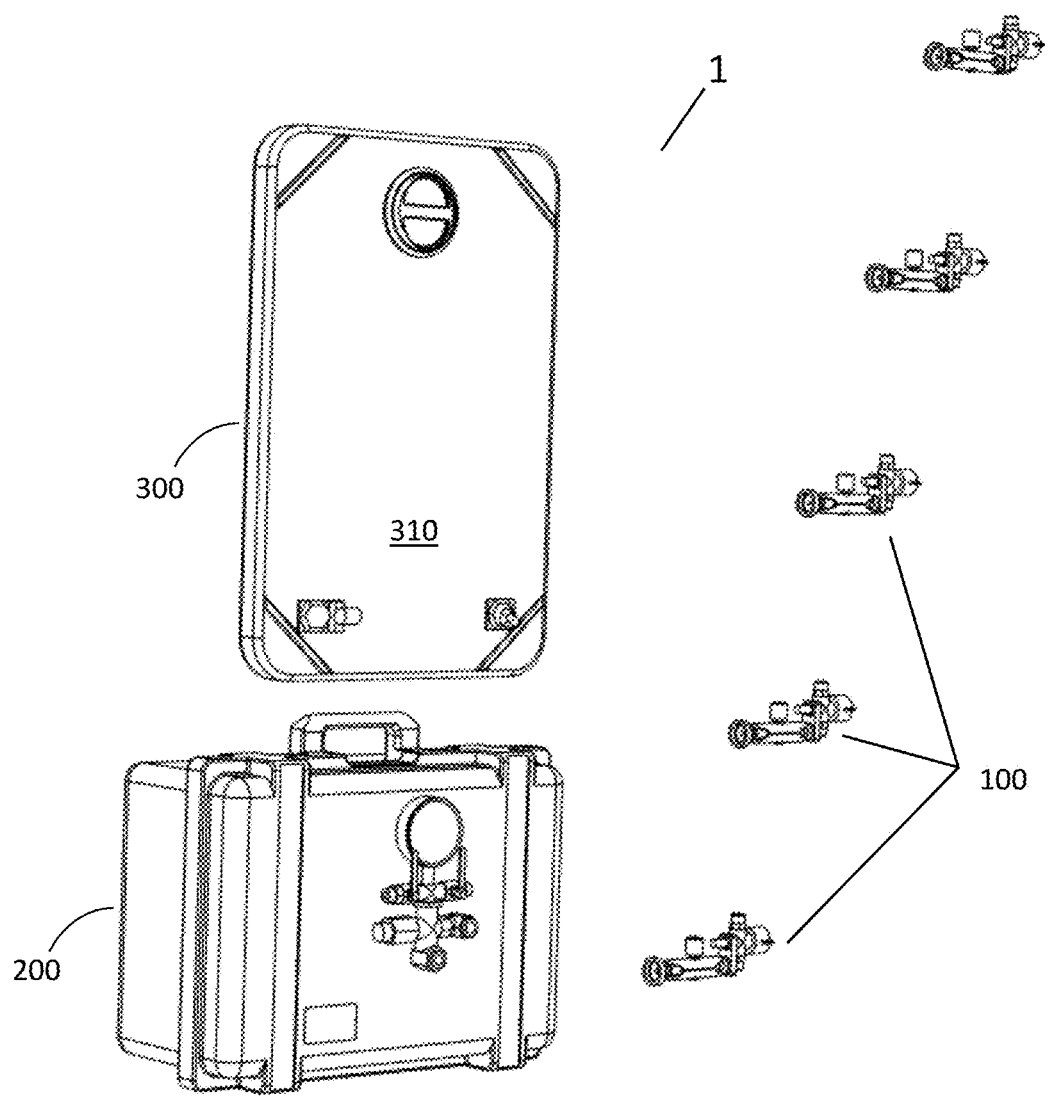
FIG. 1 shows components of an automated caged bird spray applicator system 1 in accordance with this disclosure, comprising: a plurality of nozzle assemblies 100, a portable pump system 200, and a portable backpack system 300.
Figure 2A:
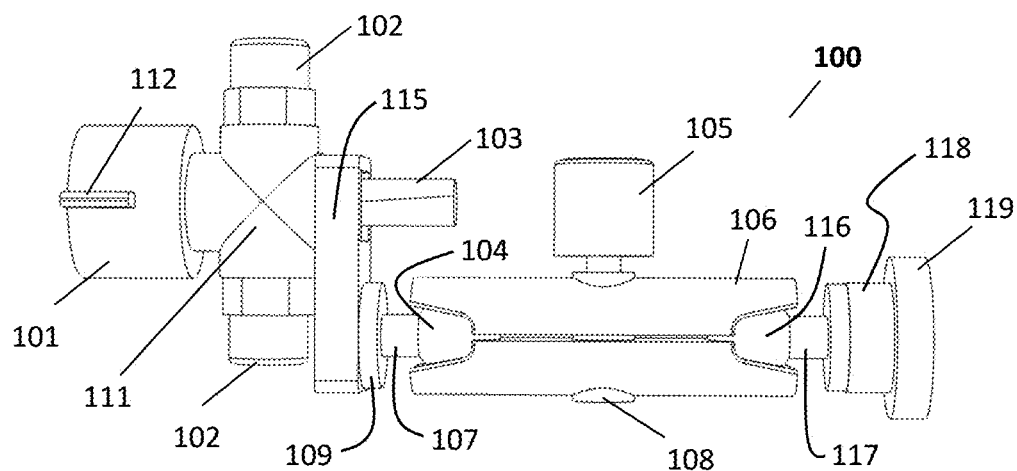
FIG. 2A shows a side view of a nozzle assembly.
Figure 2B:
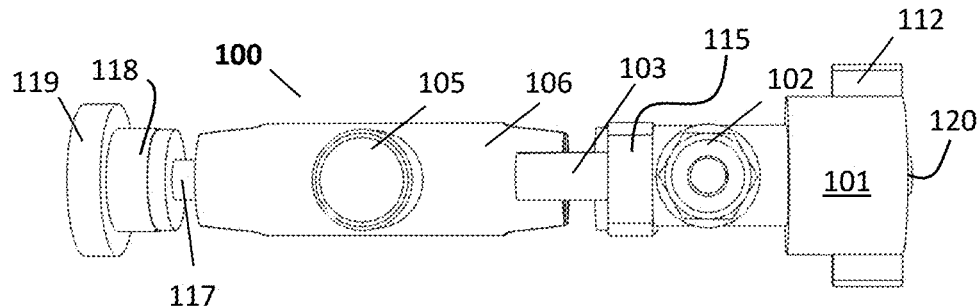
FIG. 2B shows a top view of the nozzle assembly.
Figure 2C:
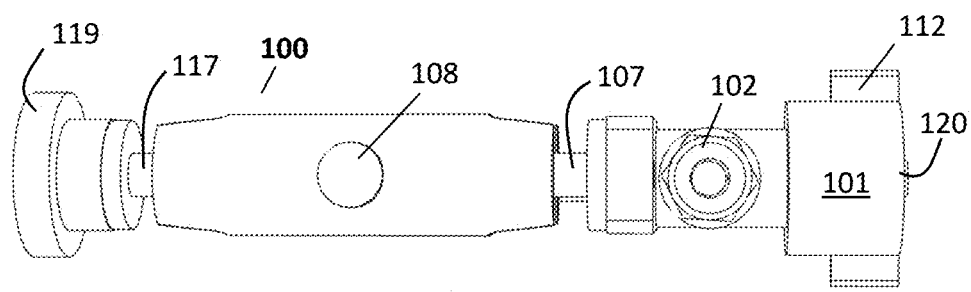
FIG. 2C shows a bottom view of the nozzle assembly.
Figure 2D:
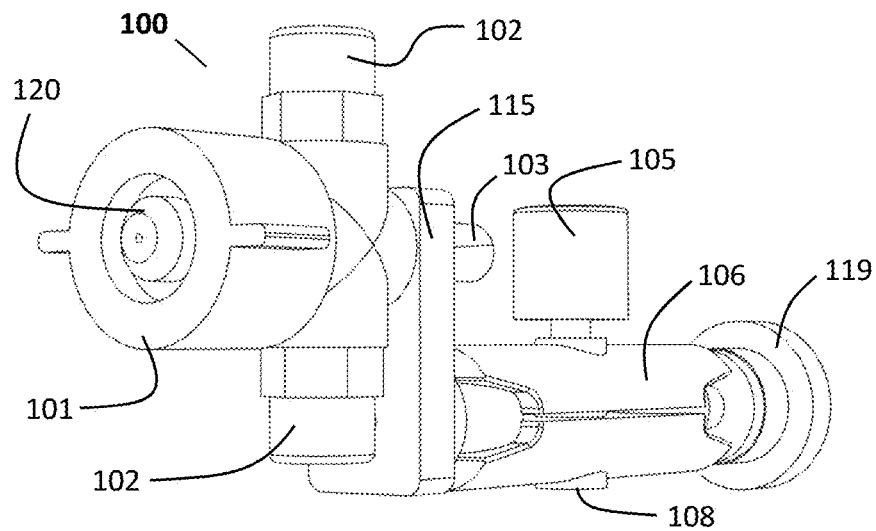
FIG. 2D shows a side/front view of the nozzle assembly showing the portion of the nozzle assembly comprising the nozzle.
Figure 2E:
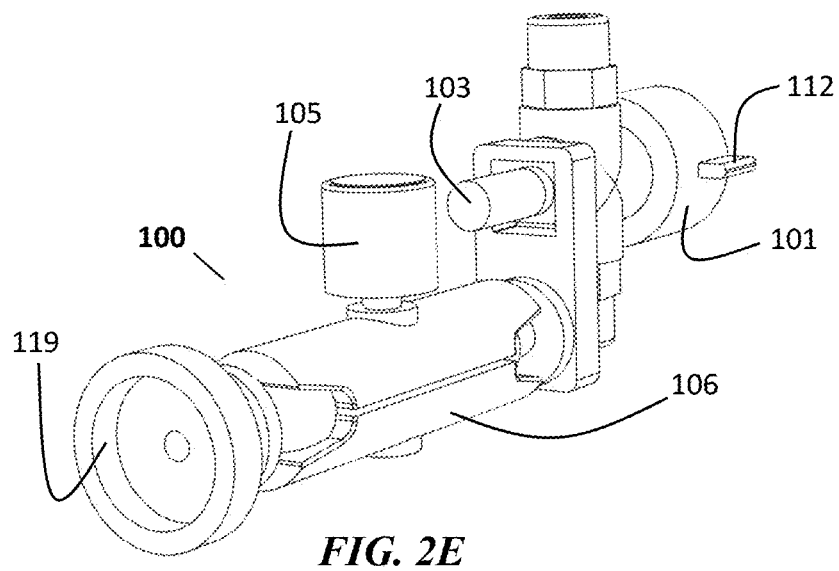
FIG. 2E shows a side/back view, showing the portion of the nozzle assembly comprising a magnet.
Figure 3A:
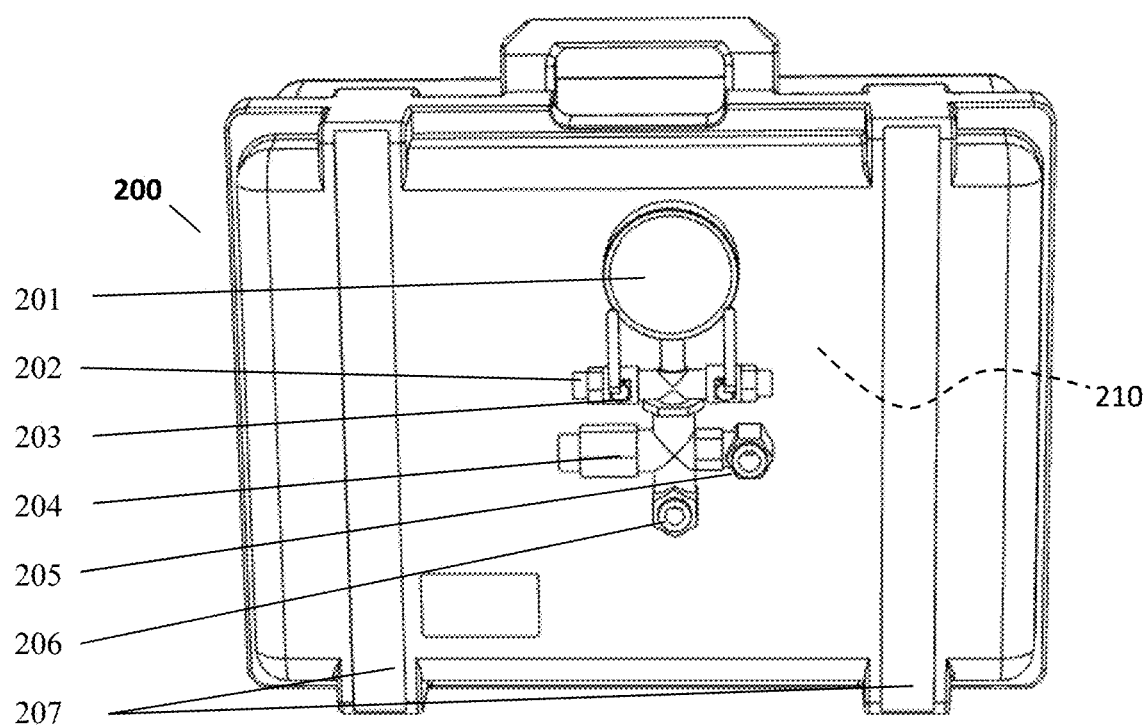
FIG. 3A shows a front view of the portable pump system.
Figure 3B:
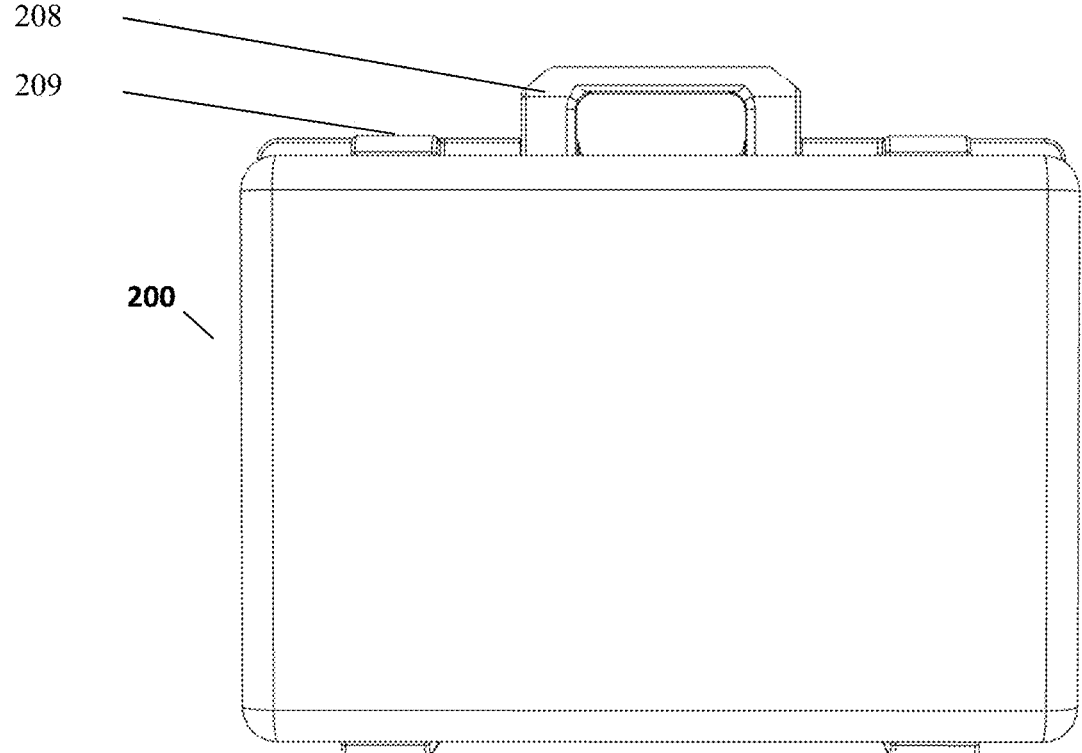
FIG. 3B shows a back view of the pump system.
Figure 3C:
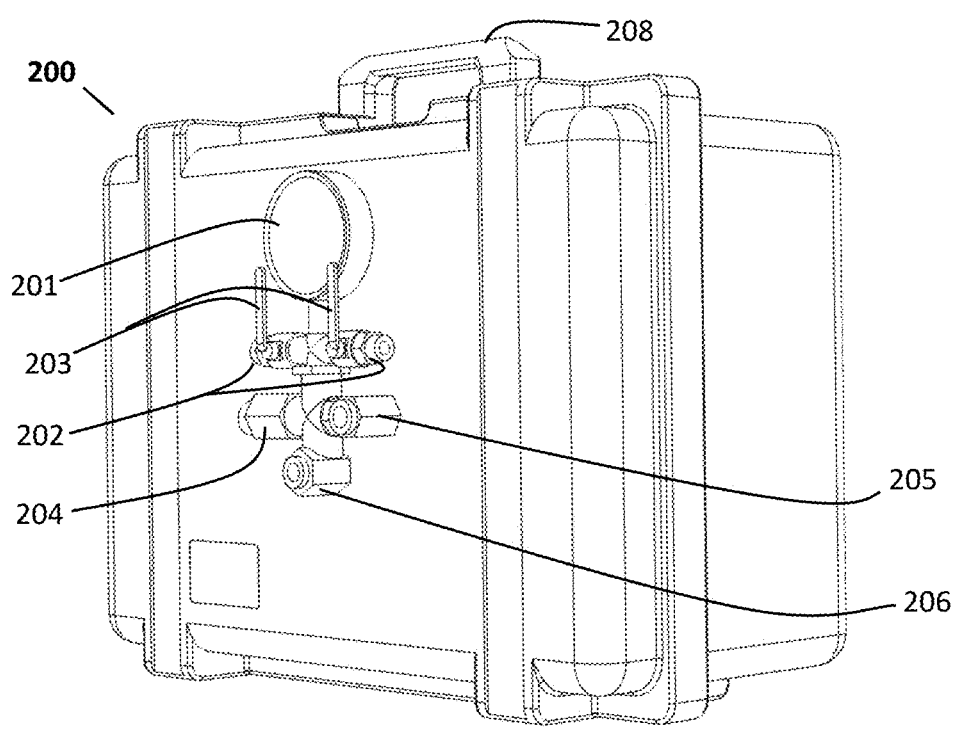
FIG. 3C shows a front/side view of the pump system.
Figure 3D:
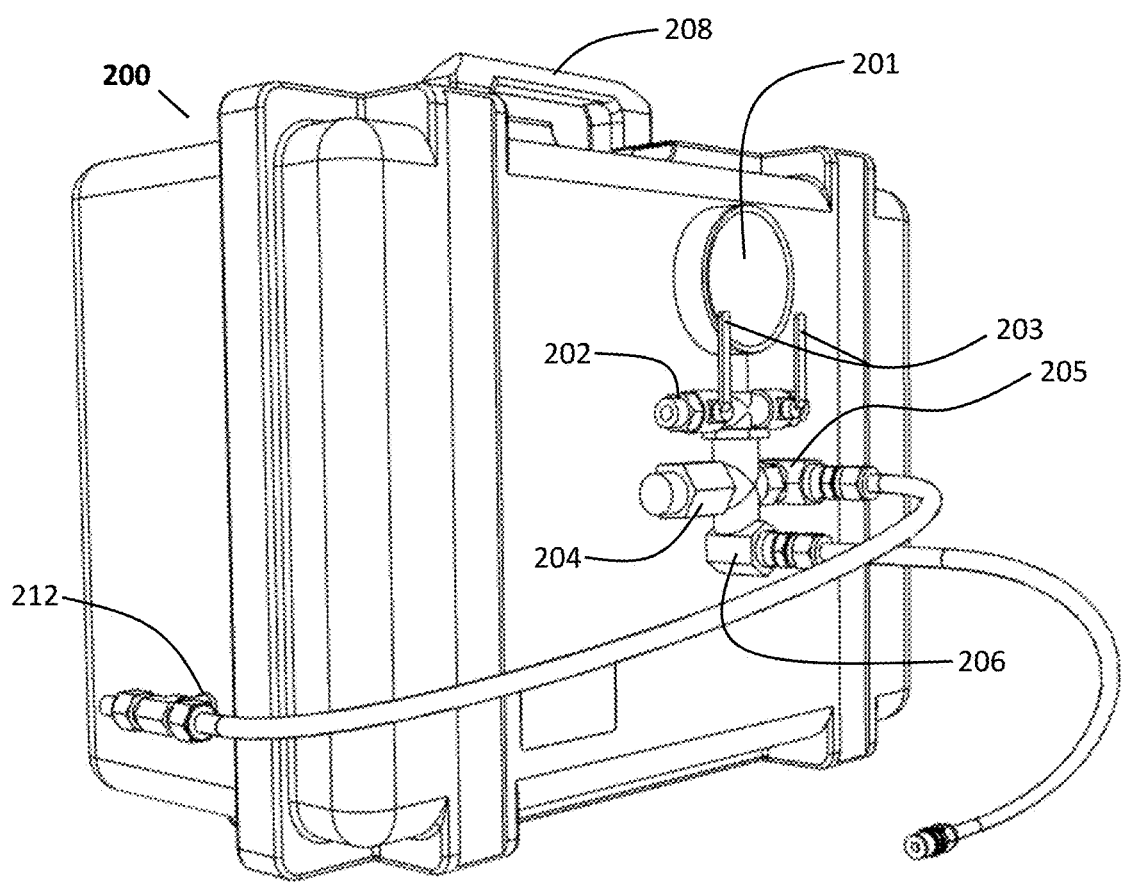
FIG. 3D shows a side/front view of the pump system.

The present invention relates to an automated caged bird spray applicator system, which is adapted to work with automated poultry house feeding systems, also known as feed trolleys.

In an embodiment, the disclosure provides an automated caged bird spray applicator system comprising a composition reservoir in the form of a back pack, along with a hand-held case which houses a pump, a regulator, a pressure gauge, a battery, a battery level indicator, an on/off switch and necessary plumbing. The case may also serve as a storage and transportation unit for the nozzles and associated plumbing/tubing.

In a second aspect, the disclosure provides a method for using the spray applicator system. In an embodiment, a system operator places the backpack directly on a preexisting automated poultry feeder system. The backpack reservoir may be filled with vaccine or other compositions, including probiotic compositions, prior to being carried to the house or filled after the bag is reversibly affixed to the feeder system.

In another embodiment, the operator opens the hand-held case, removes the nozzle assemblies and magnetically mounts said nozzle assemblies in appropriate locations of the feeder system, such that the direction of the nozzles may be adjusted to optimally deliver vaccine to the birds. Adjustment of the nozzles may be accomplished by moving the multi-positioning arm of said nozzle assembly and locking it into a position. The skilled person using the disclosed spray applicator will understand how to position and direct the nozzle to maximize the amount of vaccine, or other composition, including a probiotic formulations, that is delivered to the birds.

In one embodiment, the nozzles are positioned such that they spray vaccine directly at each cage as the feeder moves along rows of cages. In this position, the nozzles will optimally deliver vaccine whether the birds are feeding from the feed track, or whether the birds are in the rearmost portion of the cage. Wherever the birds are in their cages, the nozzles effectively deliver composition to the key target areas of the birds: the eyes, nostrils and mouths.

Once the nozzles are positioned on the feeder, optimally directed toward the cages, and locked into position, the operator may engage the feeder system and activate the spray applicator system. In an embodiment, the operator may adjust the pressure according to the speed of the feeder. As the feeder moves along the track, the birds move toward the front of the cage to feed by a learned habit known as memory trace. In in a particular embodiment, the birds are simultaneously sprayed in the target areas by the optimally-positioned nozzles, delivering and optimally amount of vaccine or other composition per unit time.

The Automated Caged Bird Spray Applicator is ideally suited for cage systems that use automatic feeders or trolleys. It provides for optimal spray nozzle placement and for precise dosage regulation. There is currently no other such device on the market.

DETAILED DESCRIPTION

Referring now in more detail to the drawings, in which like numerals indicate like parts throughout the several views, FIG. 1 illustrates an automated caged bird spray applicator system 1 according to the instant disclosure. The system may comprise: a plurality of nozzle assemblies 100, a portable pump system 200, and a portable backpack system 300. Any suitable conduits 600 may be employed to connect the components of the spray applicator system, including, but not limited to flexible hoses and tubing.

FIG. 2 provides an expanded view of a nozzle assembly 100 according to the instant disclosure. Views shown include side (A); top (B); bottom (C); side/front, showing the portion of the nozzle assembly comprising the nozzle (D); and side/back, showing the portion of the nozzle assembly 100 comprising a magnet (E). The components of the nozzle assembly 100 are operably connected to one another as depicted in the several views of FIG. 2, and comprise the following: a nozzle 110; a nozzle holder 101; a quick connect tubing connector 102 for receiving a vaccine supply conduit; a stud 103 for mounting the nozzle body 111 to a nozzle mount 115; two pivot balls 104, 116, each pivot ball connected to a stem 107, 117, respectively, and, each pivot ball 104, 116 configured to be reversibly locked into place by a pivot arm clamp 106; a screw cap 105 and a screw anchor 108, operatively connected to one another to allow for tightening and loosening of the pivot arm clamp 106 around the two pivot balls 104, 116; a nozzle body 111; and, optionally a wing/ear molded portion the nozzle holder 112.

As indicated in FIGS. 2A to 2E, the nozzle body 111 is operably connected to the first pivot ball 104 via insertion of stud 103 into an orifice of nozzle body mount 115 and attachment of nozzle body mount 115 to pivot ball mount 109. On the portion of the nozzle assembly 100 farthest away from the nozzle 120, the second pivot ball 116 is connected to a nozzle assembly base 119 via stem 117 and support 118. The base 119 may contain a permanent magnet, for reversible attachment of the nozzle assembly 100 to a suitable metal surface or frame, including to an automatic poultry feeder apparatus 400. Accordingly, clamp 106 forms a bridge between the first pivot ball 104 and the second pivot ball 116, such that the reversible tightening or loosening of the clamp 106, by the combined actuation of the screw cap 105 and the screw anchor 108, allows the nozzle 120 to be reversibly locked into a plurality of possible positions. This feature advantageously provides a user with the ability to precisely control the direction of the spray, to accommodate variations in automated poultry feeders and poultry cage configurations.

Now that this disclosure has been made, the skilled person will appreciate many routine variations to the nozzle assembly 100. For example, instead of two pivot balls 104, 116 reversibly lockable by the action of clamp 106, screw cap 105 and screw anchor 108, nozzle body 111 could be attached to nozzle assembly base 119 via reversibly lockable hinges or other suitable reversible locking means. Other functional equivalents are envisioned, provided that their structures allow for the nozzle to be positioned in a plurality of directions, to deliver the spray of liquid formulation to a desired locations.

The spray applicator system also comprises a portable pump system 200. A representative example of the pump is shown in FIG. 3, and as indicated by the multiple views, the components are operably connected to one another, and may comprise the following: a pressure gauge 201; outlet fittings 202 that allow for operable connection to a conduit 600 (see FIGS. 5 to 7), which conduit provides fluid communication between the nozzle assemblies 100 and the pump system 200; shut-off valves 203; a pressure regulator 204; a recirculation outlet 205; a recirculation inlet 212; an outlet 206 from pump 210 inside the portable pump system 200; strapping guide slots 207 for attachment to mounting straps; a carrying handle 208; and an enclosure clasp means 209 for keeping the pump system closed.

Figure 4A:
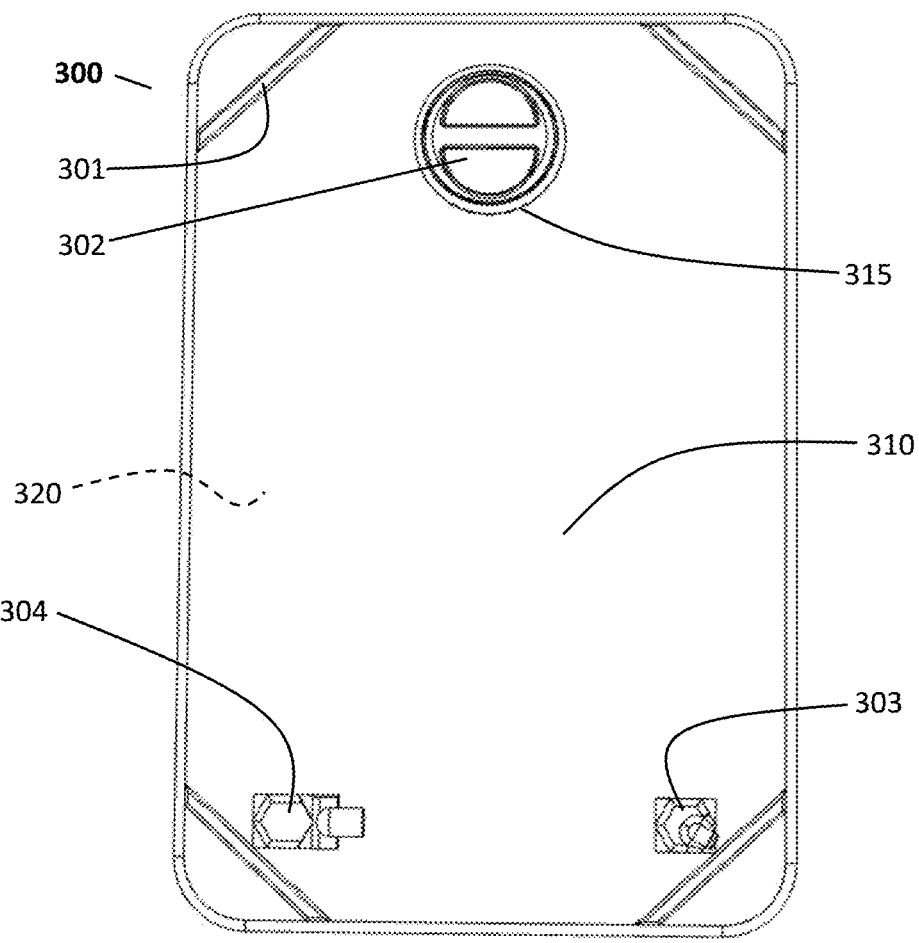
FIG. 4A shows the side of the portable backpack system 300 facing away from the wearer.
Figure 4B:
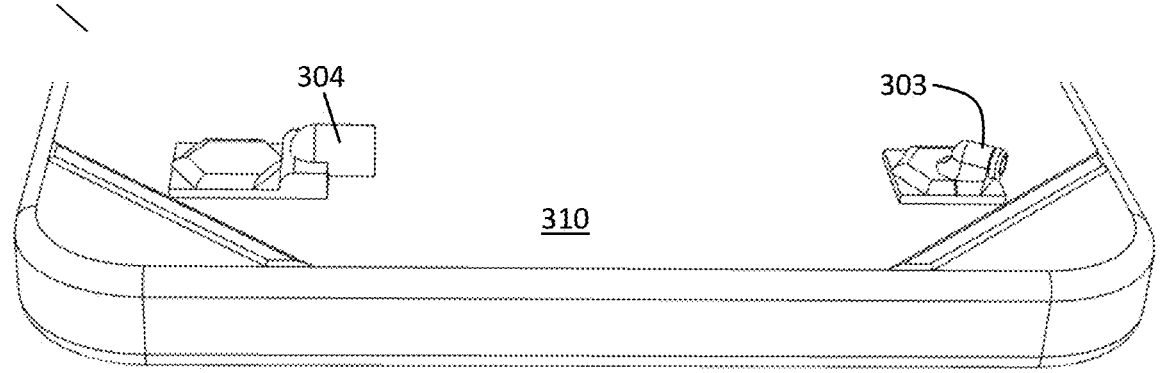
FIG. 4B shows a side/angled view emphasizing the means for connecting conduits that transfer fluid from the pump system.

Moreover, the spray applicator system comprises a portable backpack system 300 comprising a tank/reservoir 310. As illustrated in FIGS. 4A and 4B, the backpack comprises a side configured to face away from a wearer or apparatus upon which the backpack is mounted, which comprises connecting means 303, 304, for connecting to conduits that transfer fluid from the tank 310 to the pump system 200. The tank 310 may be made of any suitable material, including flexible or rigid plastic materials, and may be filled with a wide variety of compositions, including vaccine and probiotic compositions.

In some embodiments, the components of the portable backpack system 300 are operably connected to one another as shown in FIGS. 4A and 4B, and comprise: strapping points 301 for attaching the tank 310 to mounting straps; a wide mouth lid 302 for convenient filling of the tank 310; a circulation return inlet quick connect 303; and a quick-connect outlet 304 for providing for fluid communication to the pump 210. The mounting straps allow the tank system to be reversibly attached to a human wearer or an apparatus, such as an automated poultry food trolley.

Figure 5:
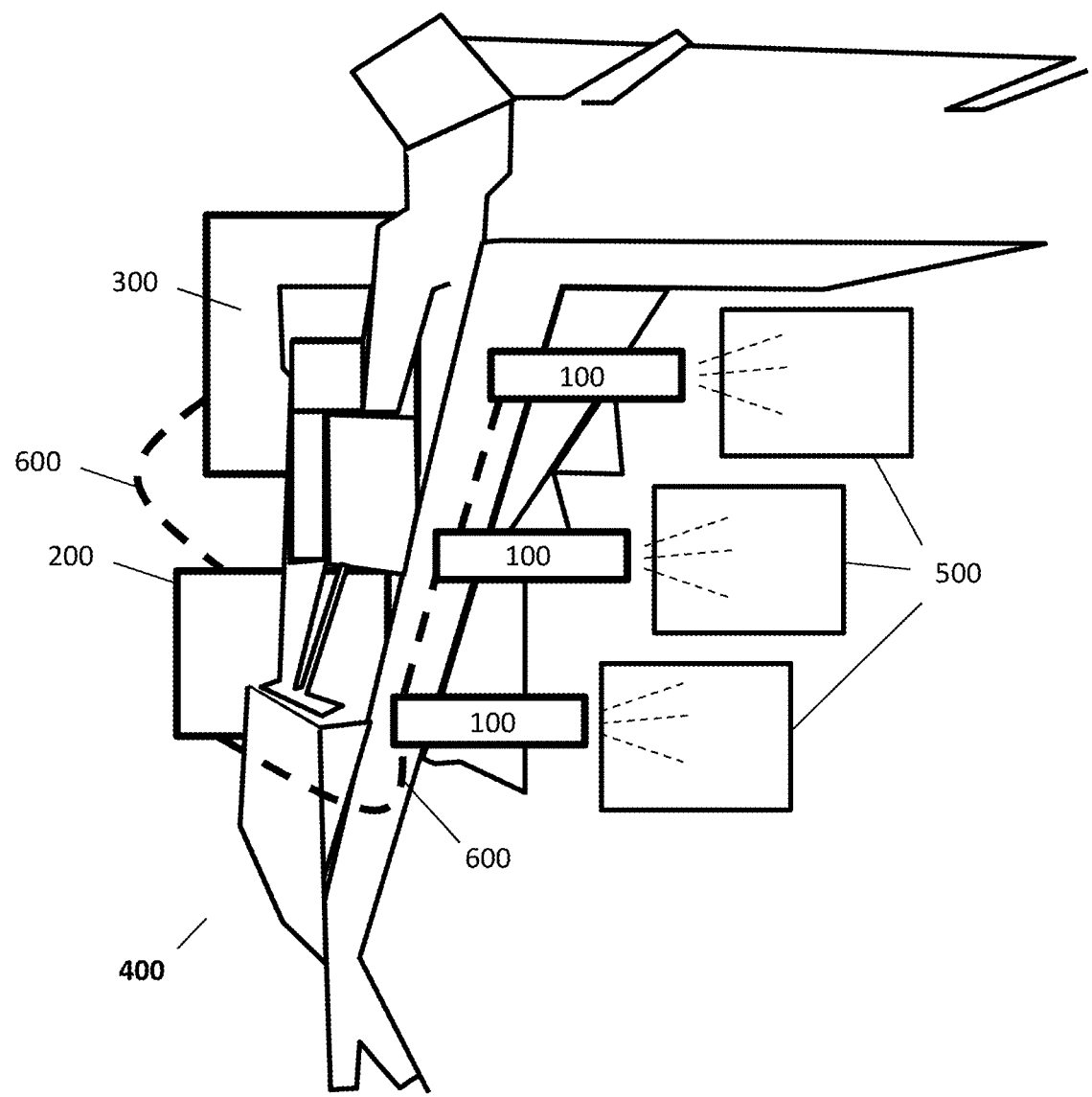
FIG. 5 shows a spray applicator system 1 of the disclosure reversibly attached to an automated poultry feeding apparatus 400.
Figure 6:
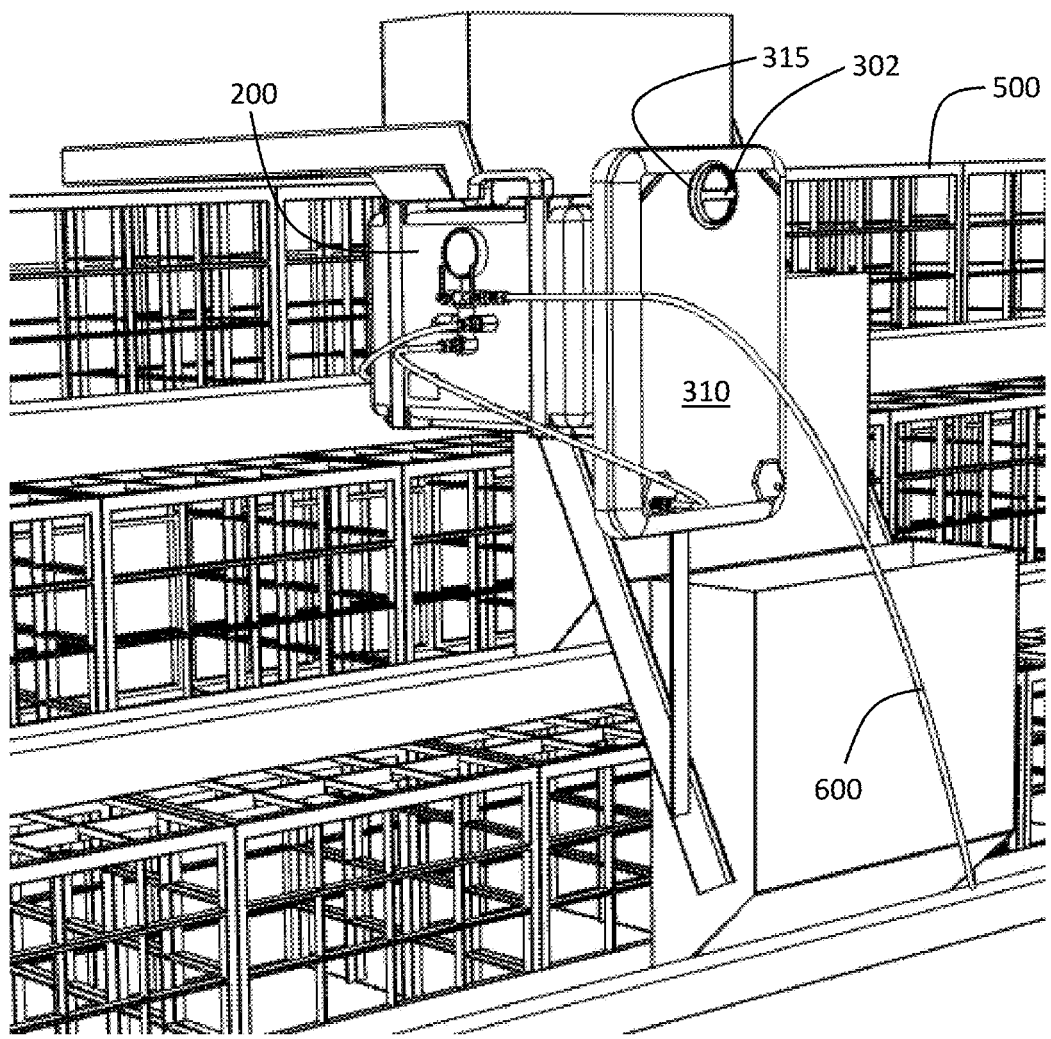
FIG. 6 shows another view of the spray applicator system.
Figure 7:
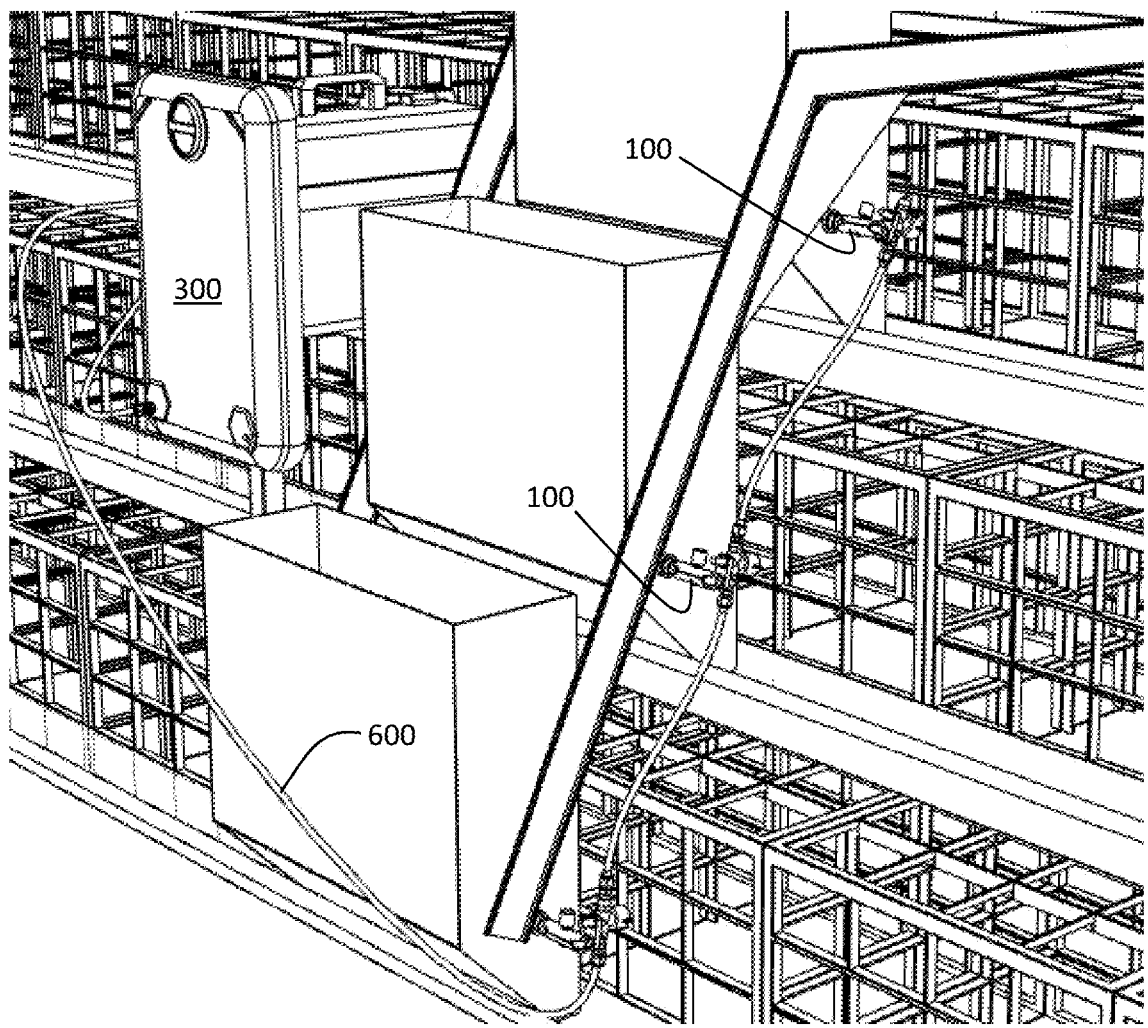
FIG. 7 shows another view of the spray applicator system.
Figure 8:
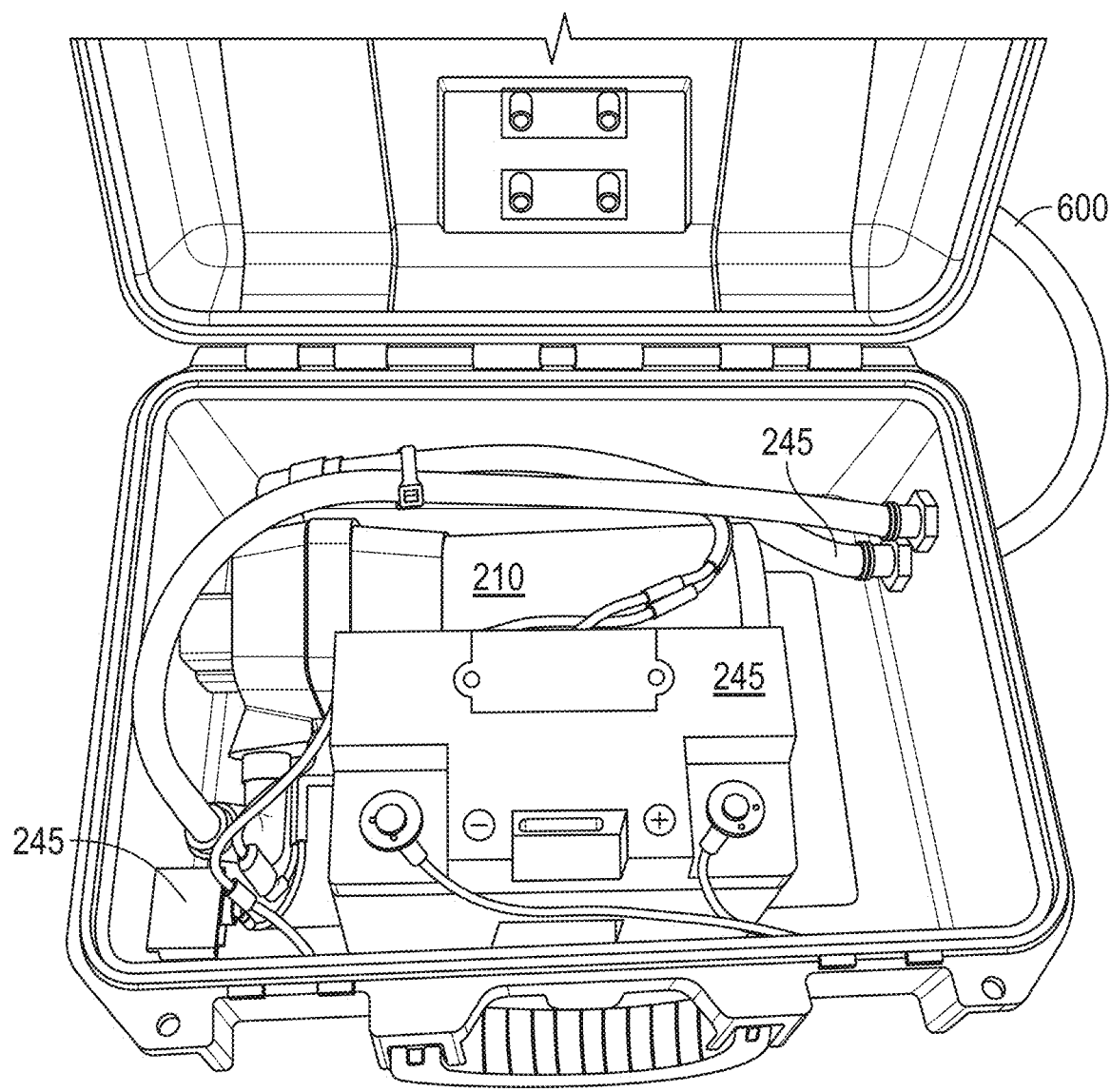
FIG. 8 shows the portable pump system in an open position, showing a pump 210, a battery 240, an on/off switch 245, and internal conduits 610.
Figure 9:
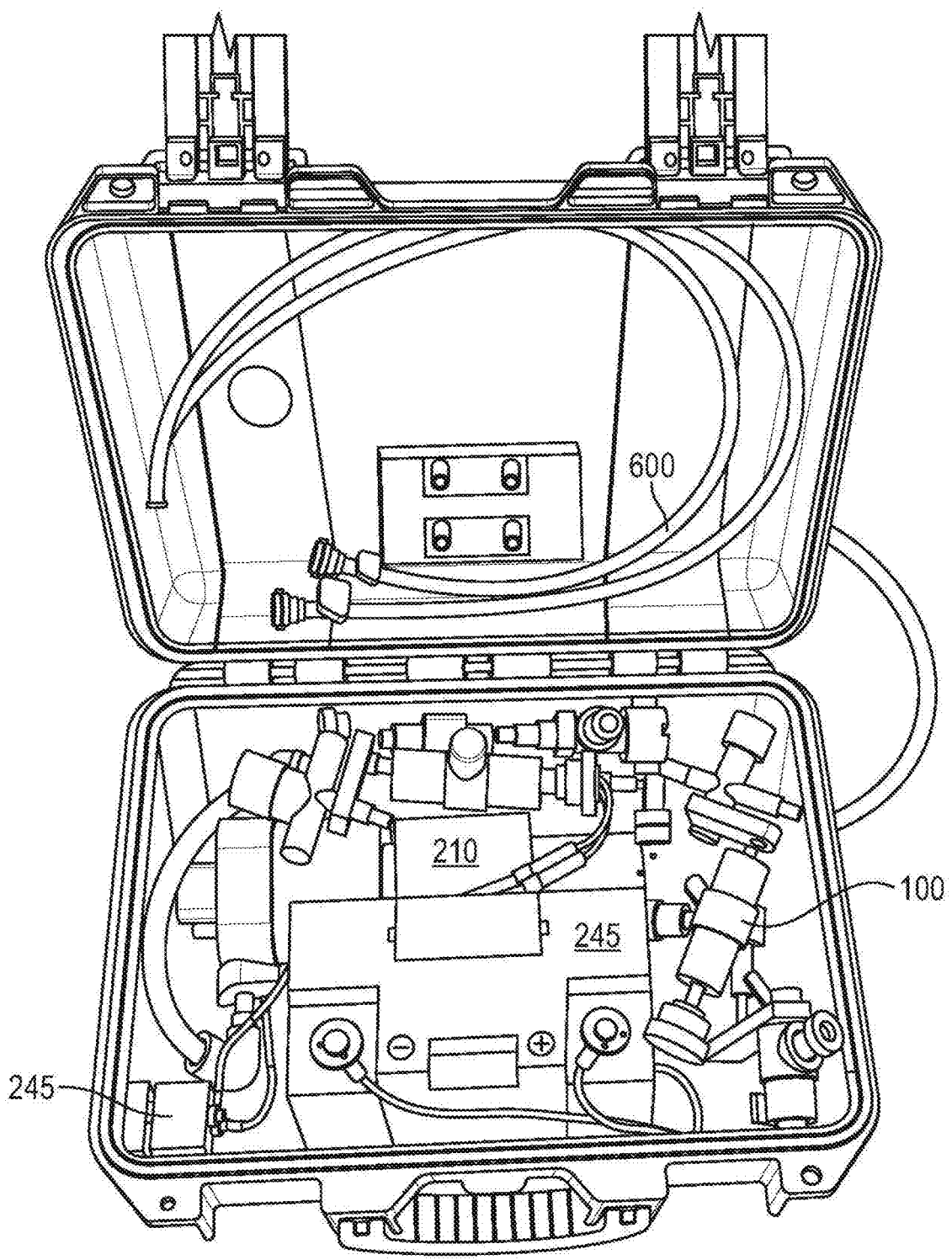
FIG. 9 shows the portable pump system 200 in an open position, and loaded with a plurality of nozzle assemblies 100 and external conduits 600.

In some embodiments, the entire spray applicator system 1 may be reversibility installed on an automated poultry feeder 400 as shown in FIGS. 5 to 7. In particular embodiments, such as the one depicted in FIGS. 6 and 7, the spray applicator system is affixed to a three (3) tier cage automated poultry feeding trolley. The portable pump system 200 and backpack system 300 may be suspended from the feeder 400 as depicted in FIGS. 6 and 7, or, from any other suitable location. Moreover, the nozzle assemblies 100 may be positioned as shown or at any other suitable locations. Routinely, an operator of the spray applicator system 1 will position the nozzle assemblies 100 to optimize the delivery of vaccine and/or probiotic formulations to the poultry, which are housed within cages 500. Suitable conduits 600 provide for fluid communication between the backpack 300 and pump 210; and, between the pump 210 and nozzle assemblies 100.

In some embodiments, the spray applicator system may be used according to the following steps:

1) filling the tank 310 via tank opening 315 with liquid formulations, including vaccine and probiotic formulations;

2) fluidly connecting the tank 310 to the portable pump system 200 by connecting a conduit from connecting means 304 to pump inlet 206;

3) fluidly connecting the pump system 200 to the nozzle assemblies 100 by connecting a conduit 600 from pump outlet 206 to nozzle assemblies 100;

4) mounting the portable pump system 200, the backpack assembly 300 and the nozzle assemblies 100 to an automated poultry feeding apparatus 400;

5) adjusting the pump 210 pressure to provide a formulation flow rate that is appropriate for the speed of the feeding apparatus;

6) allowing the feeding apparatus to move along the tiers of caged birds; and 7) switching the pump system 200 from a recirculation mode to a dispense mode, wherein when the pump system 200 is in the dispense mode, the formulation flows from the pump system 200, through the outlet 206, through conduit 600, and finally out of the nozzle assemblies 100. The foregoing steps may be completed in any reasonable order.

In some embodiments, the invention provides an automated caged bird spray applicator system 1, configured to deliver to an avian animal in need thereof a safe and effective amount of a liquid formulation. The liquid formulation may include any formulation required to be delivered to avian animals in the form of a spray of droplets. In particular embodiments, the droplets are less than about 1,000 nanometers (nm) in diameter. In other embodiments, the droplets may be less than about 900 nm, less than about 800 nm, less than about 700 nm, less than about 600 nm, less than about 500 nm, less than about 400 nm, less than about 300 nm, or less than about 200 nm. The skilled person will appreciate that any desired droplet size may be obtained through the routine variation of pressure and/or nozzle type.

In some embodiments, the liquid formulation may be selected from an immunological formulation, a vaccine formulation, an antibiotic formulation, an antifungal formulation, an anticoccidial formulation, a probiotic or prebiotic formulation, a feed additive formulation and combinations thereof.

In some embodiments, the spray applicator comprises:

a. a plurality of nozzle assemblies 100, fluidly connected to one another and to a pump 210;

b. a portable pump system 200 comprising a pump 210, which is fluidly connected to the nozzle assemblies 100 and to a supply of the liquid formulation; and c. a portable backpack system, which comprises a tank for holding the supply of the liquid formulation 320, which tank 310 is fluidly connected to the pump;

wherein system components a, b, and c are configured to be reversibly attachable to an automated poultry feeder system.

In some embodiments of the spray applicator system 1, each nozzle assembly 100 comprises the following:

a. a nozzle holder 101 (including a quick-release nozzle holder), for holding a nozzle 120, and configured to be reversibly attachable to a nozzle body 111;

b. a quick connect tubing connector 102 for connecting to a liquid formulation supply line conduit 600, which connector 102 is either contiguously molded as part of the nozzle body 111, or, is configured to be reversibly attachable to the nozzle body 111;

c. a stud 103 for mounting the nozzle body to a nozzle body mount 115, wherein the stud 103 is either contiguously molded as part of the nozzle body 111, or, is configured to reversibly attach to the nozzle body 111;

d. two pivot balls 104, 116:
  i. the first pivot ball 104 configured to be operably connected to a pivot ball mount 109, and, configured to function together with a clamp 106, to allow the nozzle 120 to be positioned in a plurality of directions;
  ii. the second pivot ball 116 configured to be operably connected to a support 118, and, configured to function together with the clamp 106, to allow the nozzle 120 to be positioned in a plurality of directions; and, wherein the support 118 is configured to connect to a nozzle assembly base 119, which base is configured to reversibly attach to an automatic poultry feeder (for example, by the further attachment to the base 119 of a permanent magnet);

e. a screw cap 105, configured to reversibly engage with a screw anchor 108, to loosen or tighten a pivot arm clamp 106 around the first pivot ball 104 and second pivot ball 116, wherein the reversible loosening or tightening allows a user to lock the nozzle assembly 100 such that the nozzle 120 points in a desired direction;

f. a pivot arm clamp 106, configured to clamp around the first and second pivot balls when the screw cap and the screw anchor are sufficiently tightened;

g. two pivot ball stems 107, 117, the first stem 107 configured to connect the first pivot ball 104 to the pivot ball mount 109; and, the second stem 117 configured to connect the second pivot ball to the support 118, which support connects the stem 117 to the nozzle assembly base 119;

h. a screw anchor 108, configured to reversibly engage with the screw cap 105; and i. optionally, a wing/ear molded portion 112 of the nozzle holder 101.

In some embodiments of the spray applicator system 1, the portable pump system 200 comprises:

a. a pump 210;

b. a pressure gauge 201, which indicates the pressure of the liquid formulation;

c. outlet fittings, which allow for operable connection to conduit 600, which provides for fluid communication between the nozzle assemblies 100 and the pump system 200;

d. shut-off valves 203;

e. a pressure regulator 204, for regulating the pressure of the liquid formulation;

f. a recirculation outlet 205, which provides for recirculation of the liquid formulation when the system 1 is not delivering liquid formulation to the nozzle assemblies 100;

g. an inlet 206 from the pump 210 contained within the portable pump system 200;

h. strapping guide slots 207 for attachment to mounting straps; a carrying handle 208; and an enclosure clasp 209 for keeping the pump system closed;

i. a power supply, for supplying power to the pump.

In some embodiments, the spray applicator system comprises:

a. a pump system 200 comprising: a pressure gauge 201; outlet fittings 202 that allow for operable connection to a conduit 600, which provides for fluid communication between the nozzle assemblies 100 and the pump system 200; shut-off valves 203; a pressure regulator 204; a recirculation outlet 205; an inlet 206 from pump 210 inside the pump system; strapping guide slots 207 for attachment to mounting straps; a carrying handle 208; and an enclosure clasp 209 for keeping the pump system closed; and b. a plurality of nozzle assemblies 100, each assembly comprising: a nozzle holder 101; a tubing connector 102 (including a quick-release connector); a stud 103 for mounting the nozzle body 111 to a mount 115; two pivot balls 104, 116: the first pivot ball 104 configured to be operably connected to a pivot ball mount 109, and, configured to function together with a clamp 106, to allow the nozzle 120 to be positioned in a plurality of directions; the second pivot ball 116 configured to be operably connected to a support 118, and, configured to function together with the clamp 106, to allow the nozzle 120 to be positioned in a plurality of directions; wherein the support 118 is configured to connect to a nozzle assembly base 119, which base is configured to reversibly attach to an automatic poultry feeder; and wherein the nozzle holder 101 optionally comprises a wing/ear molded portion 112.

In some embodiments, the spray applicator system 1 is installed on an automated poultry feeder 400.

In all of the embodiments, any connector may be of the "quick-connect" variety. Moreover, any depicted connector may be replaced with any suitable connecting means (e.g. threaded connector, quick-connect, snap-connect, and the like).

In another aspect, the invention provides a nozzle assembly 100 for use with the spray applicator system 1, comprising:

a. a nozzle holder 101, for holding a nozzle 120, and configured to be reversibly attachable to a nozzle body 111;

b. a quick connect tubing connector 102 for receiving a conduit that is fluidly connected to a supply of liquid formulation (for example, via its fluid communication with a pump 210, which pump 210 is in fluid communication with the liquid formulation supply), wherein the connector 102 is either contiguously molded as part of the nozzle body 111, or, is configured to reversibly attach to the nozzle body 111;

c. a stud (including a threaded stud) 103 for mounting the nozzle body 111 to a nozzle body mount 115, wherein the stud 103 is either contiguously molded as part of the nozzle body 111, or, is configured to reversibly attach to the nozzle body 111;

d. two pivot balls 104, 116:
  i. the first pivot ball 104 configured to be operably connected to a pivot ball mount 109, and, configured to function together with a clamp 106, to allow the nozzle 120 to be positioned in a plurality of directions;
  ii. the second pivot ball 116 configured to be operably connected to a support 118, and, configured to function together with the clamp 106, to allow the nozzle 120 to be positioned in a plurality of directions; and,
wherein the support 118 is configured to connect to a nozzle assembly base 119, which base is configured to reversibly attach to an automatic poultry feeder (for example, by the further attachment to the base 119 of a permanent magnet);
e. a screw cap 105, configured to reversibly engage with a screw anchor 108 to loosen or tighten a pivot arm clamp 106 around the first pivot ball 104 and second pivot ball 116, wherein the reversible loosening or tightening allows a user to lock the nozzle 120 into a desired position/orientation;
f. a pivot arm clamp 106, configured to clamp 106 around the first pivot ball 104 and the second pivot ball 116 when the screw cap 106 and the screw anchor 108 are engaged;
g. two pivot ball stems, the first stem 107 configured to connect the first pivot ball 104 to the nozzle-side pivot ball mount 109, which mount is configured to connect to the nozzle body mount 115, and the second stem 117 configured to connect the second pivot ball 116 to a support 118, which support is configured to connect to the nozzle assembly base 119;
h. a screw anchor 108, configured to reversibly engage with the screw cap 106; and
i. optionally, a wing/ear molded portion 112 of the nozzle holder 101.

In another aspect, the invention provides a portable pump system 200 for use with a spray applicator system 1, comprising:
a. a pump 210, in fluid communication with a liquid formulation supply 320 and at least one nozzle assembly 100, and operable to pump liquid formulation from the supply 320 to the nozzle assembly 100;
b. a pressure gauge 201, in fluid communication with the pump 210, and configured to indicate the pressure of the liquid formulation;
c. outlet fittings 202 that allow for operable connection to a conduit, which provides for fluid communication between the nozzle assembly 100 and the pump system 200;
d. shut-off valves 203, operable to reversibly interrupt the flow of liquid formulation;
e. a pressure regulator 204, operable to regulate the pressure of the liquid formulation;
f. a recirculation outlet 205, which provides for recirculation of the liquid formulation;
g. an inlet 206 configured to be in fluid communication with the liquid formulation supply, to allow the formulation to flow into the pump 210;
h. strapping guide slots 207 for attachment to mounting straps;
i. a carrying handle 208; and
j. an enclosure clasp 209 for keeping the pump system closed.

In another aspect, the invention provides a portable backpack system 300 for use with a spray applicator system 1, comprising:
a. a means for connecting conduits 600 that transfer liquid formulation to the pump system 200;
b. strapping points 301 for mounting the backpack system 300 to a poultry feeder 400;
c. a wide mouth lid 302 for receiving the liquid formulation;
d. a circulation return inlet connect 303; and
e. an outlet 304 for providing fluid communication to the pump system 200.

In yet another aspect, the invention provides a method of applying a spray of liquid formulations, including vaccine and probiotic formulations, to caged avian animals, comprising the steps of:
a. providing the spray applicator system of claim 1;
b. attaching the system to an automated poultry feeder 400;
c. directing the nozzles 120 in a direction that will effectively deliver liquid formulation to the caged avians, wherein the liquid formulation is delivered in the form of a spray of sub-micron-sized droplets;
d. starting the spray applicator system 1; and
e. adjusting the pressure to precisely and accurately deliver to the avians an effective amount of liquid formulation, thereby applying the liquid formulation to the avians.

In some embodiments of the method, the pressure adjustment is made to optimize the accuracy and precision of liquid formulation application or administration, and is based upon the speed of the automated feeder.

In some embodiments, the pressure is increased for relatively faster automated feeders, and decreased for relatively slower automated feeders.

In some embodiments, the pressure automatically adjusts based upon the speed of the automated feeder.

In other embodiments, when the poultry feeder comes to a stop, the liquid formulation is automatically switched from delivering to the nozzles (i.e. dispensing/application mode) to recirculating (i.e. recirculation mode).

The invention will now be recited in the following non-limiting claims.

What is claimed:

1. A spray applicator system for vaccinating birds enclosed in cages, wherein the cages are positioned in a row, the spray applicator system comprising:
a. a plurality of nozzle assemblies positioned to direct a spray toward the cages, fluidly connected to one another and to a pump;
b. a portable pump system comprising the pump, wherein the pump is operably connected to the nozzle assemblies and operably connected to a portable liquid reservoir;
wherein the spray applicator system is reversibly attachable to a poultry feeder system and
wherein each nozzle assembly comprises:
c. a nozzle holder, for holding a nozzle, and configured to be reversibly attachable to a nozzle body;
d. a quick connect tubing connector for connecting to a liquid formulation supply line conduct, each connector is either contiguously molded as part of the nozzle body, or, is configured to be reversibly attachable to the nozzle body;
e. a stud for mounting the nozzle body to a nozzle body mount, wherein the stud is either contiguously molded as part of the nozzle body, or, is configured to reversibly attach to the nozzle body;
f. two pivot balls:
  i. the first pivot ball configured to be operably connected to a pivot ball mount, and, configured to function together with a clamp, to allow the nozzle to be positioned in a plurality of directions;
  ii. the second pivot ball configured to be operably connected to a support, and, configured to function together with the clamp, to allow the nozzle to be positioned in a plurality of directions; and, wherein the support is configured to connect to a nozzle assembly base configured to reversibly attach to an automatic poultry feeder;

g. a screw cap, configured to reversibly engage with a screw anchor to loosen or tighten a pivot arm clamp around the first pivot ball and second pivot ball, wherein the reversible loosening or tightening allows a user to lock the nozzle assembly such that the nozzle points in a desired direction;

h. a pivot arm clamp, configured to clamp around the first and second pivot balls when the screw cap and the screw anchor are sufficiently tightened;

i. two pivot ball stems, the first stem configured to connect the first pivot ball to the pivot ball mount; and, the second stem configured to connect the second pivot ball to the support, wherein the support connects the second stem to the nozzle assembly base; and j. a screw anchor, configured to reversibly engage with the screw cap.

2. The spray applicator system of claim 1, wherein the portable pump system comprises:
   a. a pressure gauge;
   b. outlet fittings configured for operable connection to a conduit, each outlet fitting provides for fluid communication between a respective nozzle assembly and the pump system;
   c. shut-off values;
   d. a pressure regulator;
   e. a recirculation outlet, configured to provide for recirculation of the liquid formulation when the spray applicator system is not delivering liquid formulation to the nozzle assemblies;
   f. an inlet from the pump contained within the portable pump system;
   g. strapping guide slots for attachment to mounting straps; a carrying handle; and an enclosure clasp for keeping the pump system closed.

3. The spray applicator system for claim 1, wherein:
   a. the portable pump system comprises:
      a pressure gauge;
      outlet fittings that allow for operable connection to a conduit configured to
   provide for fluid communication between the nozzle assemblies and the portable pump system;
      shut-off values;
      a pressure regulator;
      a recirculation outlet;
      an inlet from pump inside;
      strapping guide slots for attachment to mounting straps;
      a carrying handle; and
      an enclosure clasp for keeping the portable pump system closed; and
   b. each nozzle assembly comprises:
      a nozzle;
      a nozzle holder;
      a quick connect tubing connector for vaccine supply line;
      a stud for mounting the nozzle body;
      two pivot balls, each connected to a pivot ball stem;
      a screw cap and a screw anchor, operably connector to allow for tightening and loosening of a pivot arm clamp;
      a pivot ball mount; and
      a nozzle body.

4. A spray applicator system for vaccinating birds enclosed in cages positioned a row, the spray applicator system comprising:
   a plurality of nozzle assemblies each positioned to direct a spray toward the cages from a nozzle during use and fluidly connected to one another; and
   a portable pump system comprising:
      a pump operably connected to the nozzle assemblies and operably connected to
      a portable liquid reservoir; and
   wherein the spray applicator system is reversibly attachable to an automated poultry feeder system movable along the row of cages; and
   wherein during use each of the nozzle assemblies is reversibly mounted onto the automated poultry feeder system using a magnet operably connected to the nozzle to allow the nozzle assemblies to move along the rows of cages with the automated poultry feeder system such that the nozzle assemblies deliver a composition to birds in the cages in a consistent spray application controlled by a speed of travel of the automated poultry feeder system.

5. The automated spray applicator system of claim 4 wherein each nozzle assembly comprises:

a nozzle holder, for holding the nozzle, and configured to be reversibly attachable to a nozzle body;

a quick connect tubing connector for connecting to a liquid formulation supply line conduit, each connector is either contiguously molded as part of the nozzle body, or, is configured to be reversibly attachable to the nozzle body;

a stud for mounting the nozzle body to a nozzle body mount, wherein the stud is either contiguously molded as part of the nozzle body, or, is configured to reversibly attach to the nozzle body;

two pivot balls:

i. the first pivot ball configured to be operably connected to a pivot ball mount, and, configured to function together with a clamp, to allow the nozzle to be positioned in a plurality of directions;

ii. the second pivot ball configured to be operably connected to a support, and, configured to function together with the clamp, to allow the nozzle to be positioned in a plurality of directions; and wherein the support is configured to connect to a nozzle assembly base configured to reversibly attach to the automatic poultry feeder system;

a screw cap, configured to reversibly engage with a screw anchor to loosen or tighten a pivot arm clamp around the first pivot ball and second pivot ball, wherein the reversible loosening or tightening allows a user to lock the nozzle assembly such that the nozzle points in a desired direction;

a pivot arm clamp, configured to clamp around the first and second pivot balls when the screw cap and the screw anchor are sufficiently tightened;

two pivot ball stems, the first stem configured to connect the first pivot ball to the pivot ball mount; and, the second stem configured to connect to the second pivot ball to the support, wherein the support connects the second stem to the nozzle assembly base; and a screw anchor, configured to reversibly engage with the screw cap.

6. A spray applicator system for vaccinating birds enclosed in cages positioned a row, the spray applicator system comprising:

a plurality of nozzle assemblies positioned to direct a spray toward the cages, fluidly connected to one another;

a portable pump system comprising:

a pump operably connected to the nozzle assemblies and operably connected to a portable liquid reservoir;
a pressure gauge;
outlet fittings, which allow for operable connection to a conduit, configured to provide fluid communication between the nozzle assemblies and the pump system;
shut-off values;
a pressure regulator;
a recirculator outlet, configured to provide recirculation of the liquid formulation when the spray applicator system is not delivering liquid formulation to the nozzle assemblies;
an inlet from the pump contained within the portable pump system;
strapping guide slots for attachment to mounting straps;
a carrying handle; and
an enclosure clasp for keeping the pump system closed;
wherein during use the spray applicator system is attachable to an automated poultry feeder system that is movable along the row of cages; and
wherein each of the nozzle assemblies comprise a nozzle that mounts directly onto the automated poultry feeder system using a magnet.

7. The automated spray applicator system of claim 4 wherein each nozzle assembly comprises:
the nozzle comprising a nozzle body;
a nozzle holder;
a quick connect tubing connector for vaccine supply line;
a stud for mounting the nozzle body;
two pivot balls, each connected to a pivot ball stem;
a screw cap and screw anchor, operably connected to allow for tightening and loosening of a pivot arm clamp;
a pivot ball mount and wherein the pump system comprises:
the pump system comprises:
a pressure gauge;
outlet fittings that allow for operable connection to a conduit, configured to provide fluid communication between the nozzle assemblies and the pump system;
shut-off values;
a pressure regulator;
a recirculation outlet;
an inlet from pump inside;
strapping guide slots for attachment to mounting straps;
a carrying handle; and
an enclosure clasp for keeping the pump system closed.

* * * * *